United States Patent
Bekele

[11] Patent Number: 5,925,454
[45] Date of Patent: Jul. 20, 1999

[54] FILM HAVING MODIFIED SURFACE CHARACTERISTICS THROUGH USE OF COMBINATION OF SPHERICAL AND LAMELLAR PARTICULATES

[75] Inventor: Solomon Bekele, Taylors, S.C.

[73] Assignee: W.R. Grace & Co.-Conn., Duncan, S.C.

[21] Appl. No.: 08/501,260

[22] Filed: Jul. 11, 1995

[51] Int. Cl.[6] ............................................. B32B 5/00
[52] U.S. Cl. .................. 428/324; 428/325; 428/330; 428/331; 428/332; 428/454; 428/476.1; 428/483; 428/516; 428/518; 428/34.5; 428/34.7
[58] Field of Search ........................ 428/35.2, 35.4, 428/35.5, 324, 328, 330, 331, 454, 516, 518, 476.1, 483, 332, 34.5, 34.6, 34.7, 325

[56] References Cited

U.S. PATENT DOCUMENTS

| | | | |
|---|---|---|---|
| 3,410,928 | 11/1968 | Baum | 260/897 |
| 3,741,253 | 6/1973 | Brax et al. | 138/137 |
| 4,064,296 | 12/1977 | Bornstein et al. | 428/35 |
| 4,278,738 | 7/1981 | Brax et al. | 428/515 |
| 4,618,528 | 10/1986 | Sacks et al. | 428/331 |
| 4,675,122 | 6/1987 | Luers et al. | 252/28 |
| 4,983,432 | 1/1991 | Bissot | 428/324 |
| 5,206,075 | 4/1993 | Hodson, Jr. | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,308,666 | 5/1994 | Borchardt | 428/35.2 |

FOREIGN PATENT DOCUMENTS

| | | |
|---|---|---|
| 0 124 310 | 7/1984 | European Pat. Off. . |
| 0 138 203 | 4/1985 | European Pat. Off. . |
| 0 621 205 | 10/1994 | European Pat. Off. . |
| 0 712 896 | 11/1994 | European Pat. Off. . |
| 0 707 957 | 10/1995 | European Pat. Off. . |
| A63-235336 | 9/1988 | Japan . |
| A07138471 | 5/1995 | Japan . |
| WO 90/03414 | 4/1990 | WIPO . |
| WO 93/03093 | 2/1993 | WIPO . |

OTHER PUBLICATIONS

High Performance . . . Mizusawa Industrial 1–6.
Sylobloc Anti–Blocking . . . Grace Davison 1–2.
Exceptional Rheology Polar Minerals 1–2.
Determination of . . . J. Polymer Science 441–455.
ASTM D 2732 ASTM Standards 368–371.
Silica Plastics Additives & Modifiers Handbook 521–527.

*Primary Examiner*—Rena Dye
*Attorney, Agent, or Firm*—Rupert B. Hurley Jr.

[57] ABSTRACT

A combination of lamellar and spherical particulates provides a film with desired slip and antiblock characteristics, in the absence of loose dust on the surface of the film. The film exhibits improved machinability over comparative films having either lamellar or spherical particulates. The invention is also directed to a composition of matter comprising a polymer having the mixture of lamellar and spherical particulates.

28 Claims, 2 Drawing Sheets

FIG. 1

FIG. 2 in# FILM HAVING MODIFIED SURFACE CHARACTERISTICS THROUGH USE OF COMBINATION OF SPHERICAL AND LAMELLAR PARTICULATES

FIELD OF THE INVENTION

The present invention relates generally to films, both monolayer films and multilayer films, and particularly to packaging films. The present invention also relates to packages comprising products packaged in a film. The present invention is particularly related to films having a relatively low film-to-film coefficient of friction as well as a high resistance to blocking.

BACKGROUND OF THE INVENTION

For some time it has been known to provide loose dust, e.g., loose corn starch dust, on an outer surface of a film, in order to facilitate its subsequent processing on high speed packaging machines. That is, dust applied to the surface of the film lowers the film-to-film coefficient of friction, i.e., acts as a slip agent (lubricant), as well as improving the resistance of the film to "blocking", i.e, as an anti-blocking agent. Blocking is an undesirable adhesion between layers of plastic, particularly rolled up film, that may develop during storage.

For some time it has also been known to incorporate particulate antiblocking agent into the resin. The incorporated antiblocking agent functions by forming minute protrusions that maintain separating air spaces that interfere with adhesion, i.e., blocking.

However, the application of dust to the film is detrimental to the quality of the atmosphere in which the film is manufactured and used, and the dust is subject to sloughing off of the film during shippage, etc., and other undesirable effects. Furthermore, films having antiblocking agent incorporated into the resin do not possess a desired combination of slip and antiblock properties. Thus, it would be desirable to reduce or eliminate dust on the surface of the film, while providing the film with desired slip and antiblock properties.

It has also been known to provide the film with a slip agent, which is generally provided in at least the outer layer(s) of the film. The slip agent migrates to one or more outer surface(s) of the film, i.e, "blooms" to one or more outer surfaces, thereby decreasing the film-to-film coefficient of friction, i.e., resulting in a film which slides more easily against itself and other materials. However, it has been found that: (1) the desired coefficient of friction is not obtained until the slip agent is given adequate time to bloom to the film surface, and (2) the blooming of the slip agent to the surface of the film can adversely affect the printability of the film, as ink adhesion can be reduced by the presence of the slip agent.

Thus, it would be desirable to provide a film which exhibits a low film-to-film coefficient of friction, as well as a low film-to-equipment/metal coefficient of friction, along with good antiblock properties, without having loose dust on the surface of the film. It would be still more desirable to provide a film which exhibits low film-to-film coefficient of friction without the presence of a slip agent which interferes with the printability of the film.

SUMMARY OF THE INVENTION

It has been discovered that a desired combination of slip and antiblock characteristics can be achieved by providing the outer surface(s) of a film with a combination of substantially lamellar particulates and substantially spherical particulates. Although inorganic particulates are believed to be preferred, it is believed that substantially spherical and substantially lamellar organic particulates could also be beneficially used. The substantially lamellar particulates are believed to provide the desired slip characteristics, while the substantially spherical particulates are believed to provide the desired antiblock characteristics. Furthermore, if a conventional wax-type slip agent is not used in the film of the invention, the slip characteristics can be obtained immediately upon formation of the film, rather than requiring time to bloom to the surface of the film.

As a first aspect, the present invention is directed to a film containing a composition. The composition comprises a mixture which comprises inorganic substantially spherical particulates, and inorganic substantially lamellar particulates. The substantially spherical particulates and the substantially lamellar particulates are present in an outer film layer and on an outer surface of the film. The substantially spherical particulates preferably have an average particle size of from about 0.1 to 30 microns; more preferably, from about 1 to 20 microns; still more preferably, from about 3 to 10 microns; and yet still more preferably, from about 3 to 4 microns. Preferably, the inorganic substantially lamellar particulates have an average aspect ratio, based on either length to thickness, or on diameter to thickness, of at least about 5:1, and preferably the average aspect ratio is as high as possible.

Presently, the available lamellar particulates have an average aspect ratio of from about 5:1 to 20:1. However, if available, preferably the lamellar particulates preferably have an average aspect ratio of from about 5:1 to 100:1; more preferably, from about to 10:1 to 50:1; still more preferably, about 20:1 (as 20:1 is the most common average aspect ratio currently available). Preferably, the inorganic substantially lamellar particulates also have a major dimension, i.e., largest dimension, of from about 0.1 to 15 microns; more preferably, from about 1 to 10 microns; still more preferably, from about 1 to 8 microns.

The substantially spherical particulates and the substantially lamellar particulates are present together in an outer film layer and on an outer surface of the film. Preferably, the mixture is a substantially homogeneous mixture of the substantially spherical particulates and the substantially lamellar particulates.

Preferably, the substantially lamellar particulates have a hardness of from about 1 to 7, on a Mohs hardness scale; more preferably, from about 1 to 5; still more preferably from about 1 to 3.

Preferably, the composition further comprises a slip enhancer comprising at least one member selected from the group consisting of fatty acid amide, oxidized polyethylene, fatty acid ester, and fatty acid alcohol. More preferably, the slip enhancer comprises at least one member selected from the group consisting of erucamide, oleamide, stearamide, behenamide, oxidized polyethylene wax, glycerol monostearate, metallic stearate. Calcium stearate is a particularly preferred metallic stearate, and ethylene bis-stearamide is a particularly preferred stearamide. Preferably, the slip enhancer is present in the outer film layer in an amount of from about 50 to 10,000 parts per million, based on the weight of the outer layer; more preferably, from about 100 to 5,000 ppm; still more preferably, from about 200 to 1000 ppm; and yet still more preferably, from about 200 to 800 ppm.

The composition may further comprise a printability enhancer comprising a polar polymer. Preferably, the polar polymer comprises at least one member selected from the group consisting of ethylene/ester/maleic anhydride terpolymer, ethylene/ester/glycidyl methacrylate terpolymer, and ethylene/acrylic acid copolymer. Preferably, the printability enhancer is present in the outer film layer in an amount of from about 1 to 25 percent, based on the weight of the outer film layer; more preferably, from about 2 to 20 percent; still more preferably, from about 5 to 15 percent; yet still more preferably, from about 5 to 10 percent.

Preferably, the substantially spherical particulates are present in the outer layer of the film at a concentration of from about 500–50,000 parts per million, based on the weight of the outer film layer; more preferably, from about 1,000 to 30,000 ppm; still more preferably, from about 2,000 to 20,000 ppm; and yet still more preferably, from about 4,000 to 8,000 ppm. Preferably, the substantially lamellar particulates are present in the outer layer of the film at a concentration of from about 500 to 50,000 parts per million, based on the weight of the outer film layer; more preferably, from about 1000 to 30,000 ppm; still more preferably, from about 1,000 to 20,000 ppm; and yet still more preferably, from about 2,000 to 4,000 ppm.

Preferably, the substantially spherical particulates comprise at least one member selected the group consisting of silica and silicate; more preferably, at least one member selected the group consisting of natural silica, synthetic silica, and silicate; and still more preferably, at least one member selected the group consisting of diatomaceous earth, fumed synthetic silica, precipitated synthetic silica, gelled synthetic silica, sodium calcium silicate, and sodium calcium aluminum silicate.

Preferably, the substantially lamellar particulates comprise silicate; more preferably, at least one member selected the group consisting of magnesium silicate and hydrated aluminum silicate; still more preferably, at least one member selected, from the group consisting of talc and kaolin.

Although the film of the present invention can be a monolayer film, preferably the film is a multilayer film. More preferably, the multilayer film comprises an $O_2$-barrier layer comprising at least one member selected from the group consisting of polyvinylidene chloride, ethylene/vinyl alcohol copolymer, polyamide, and polyester. More preferably, the multilayer film comprises an outer first layer, an inner second layer, and an outer third layer. The outer first layer preferably comprises at least one member selected from the group consisting of ethylene/vinyl acetate copolymer, ethylene/alpha-olefin copolymer, and polyamide; the inner second layer is the $O_2$-barrier layer, and comprises at least one member selected from the group consisting of polyvinylidene chloride, ethylene/vinyl alcohol copolymer, polyamide, and polyester. The outer third layer preferably comprises at least one member selected from the group consisting of ethylene/vinyl acetate copolymer, ethylene/alpha-olefin copolymer, and polyamide.

A preferred embodiment of this preferred multilayer film further comprises a fourth layer between the first layer and the second layer. The fourth layer comprises at least one member selected from the group consisting of ethylene/vinyl acetate copolymer, ethylene/alpha-olefin copolymer, and polyamide. In this film, the first layer and the fourth layer preferably each comprise crosslinked polymer, and the second layer and the third layer do not comprise crosslinked polymer.

In yet another embodiment, the multilayer film further comprises a fifth layer and a sixth layer. The fifth layer is a first tie layer comprising at least one member selected from the group consisting of ethylene/carboxylic acid copolymer, ethylene/ester copolymer, and anhydride-modified ethylene/alpha-olefin copolymer. The sixth layer is a second tie layer comprising at least one member selected from the group consisting of ethylene/carboxylic acid copolymer, ethylene/ester copolymer, and anhydride-modified ethylene/alpha-olefin copolymer. The fifth layer is between the fourth layer and the second layer, and the sixth layer is between the second layer and the third layer. Preferably, all layers of the multilayer film comprise crosslinked polymer.

Another preferred embodiment of the three-layer film described above further comprises a fourth layer. The fourth layer is a tie layer and comprises at least one member selected from the group consisting of ethylene/carboxylic acid copolymer, ethylene/ester copolymer, and anhydride modified ethylene/alpha-olefin copolymer. Preferably, the fourth layer is a first tie layer and is between the first layer and the second layer, and the film further comprises a fifth layer, the fifth layer being a second tie layer, the fifth layer comprising at least one member selected from the group consisting of ethylene/carboxylic acid copolymer, ethylene/ester copolymer, and anhydride modified ethylene/alpha-olefin copolymer, the fifth layer being between the second layer and the third layer.

One preferred multilayer film according to the present invention is substantially symmetrical with respect to both layer thickness and layer chemical composition.

Preferably, the film has a total free shrink, at 185° F., of from about 10 to 100 percent; more preferably, from about 10 to 80 percent; still more preferably, from about 20 to 60 percent. Preferably, the film is biaxially oriented.

Preferably, the film comprises crosslinked polymer.

As a second aspect, the present invention is directed to a film tube comprising the film as set forth above. One preferred film tube has a dustless tube outside surface having the composition as set forth above, and a tube inside surface having dust thereon. Preferably, the dust comprises at least one member selected from the group consisting of aluminum silica, silicon dioxide, sodium calcium alumino silicate, magnesium silicate, and calcium silicate; more preferably, the dust comprises at least one member selected from the group consisting of corn starch, potato starch, talc, and silica. The tube can be seamless or comprise a longitudinal seam. The longitudinal seam can comprise a lap seal, a fin seal, or a butt seal with a backseaming tape.

As a third aspect, the present invention is directed to bags (both end-seal bags and side-seal bags) and casings (both seamless casings and backseamed casings) comprising the film or tube according to the invention. The present invention is also directed to packages comprising a product packaged in a bag or casing comprising the film or tube according to the present invention. Typical products include meat, preferably beef, pork, foul, fish, lamb, etc., both fresh as well as processed, e.g., sausage.

As a fourth aspect, the present invention relates to a composition of matter comprising a thermoplastic polymer, inorganic substantially spherical particulates, and inorganic substantially lamellar particulates. The inorganic substantially spherical particulates have an average particle size of from about 0.1 to 30 microns. The inorganic substantially lamellar particulates have an average aspect ratio of from about 5:1 to 40:1, and a major dimension of from about 0.1 to 15 microns. Preferably, the polymer comprises ethylene/alpha-olefin copolymer, more preferably, the polymer consists of ethylene/alpha-olefin copolymer.

For a dispersion concentrate, preferably the polymer is present in an amount of from about 70 to 99.9 weight percent, based on the weight of the composition, with the inorganic particulates present in an amount of from about 0.1 to 30 weight percent, based on the weight of the composition. More preferably, the polymer is present in an amount of from about 85 to 95 weight percent, based on the weight of the composition, with the inorganic particulates present in an amount of from about 5 to 15 weight percent, based on the weight of the composition.

In a final product, preferably the polymer is present in an amount of from about 95 to 99.9 weight percent, based on the weight of the composition, with the inorganic particulates are present in an amount of from about 0.1 to 5 weight percent, based on the weight of the composition. More preferably, the polymer is present in an amount of from about 98.5 to 99.5 weight percent, based on the weight of the composition, with the inorganic particulates present in an amount of from about 0.5 to 1.5 weight percent, based on the weight of the composition.

DETAILED DESCRIPTION OF THE INVENTION

As used herein, the term "film" is used in a generic sense to include plastic web, regardless of whether it is film or sheet.

As used herein, the term "package" refers to a product packaged in a packaging material, such as a film.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a hot wire, hot knife, heated bar, hot air, infrared radiation, ultrasonic sealing, etc. More preferably, the seal is formed by hot wire and/or hot knife. As is known to those of skill in the art, a static lap seal is another seal useful in forming a package from the film of the present invention.

As used herein, the phrase ". . . present in an outer film layer and on an outer surface of the film . . ." refers to an outer film layer which has the recited components within the cross-section of the layer, as well as on the outer surface of the film.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and preferably the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s).

As used herein, the word "mer" refers to a unit of a polymer, as derived from a monomer used in the polymerization reaction. For example, the phrase "alpha-olefin polymerization units" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alphaolefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPE's which are available commercially which generally have a broad composition distribution as assessed by CDBI values generally less than 55%. The CDBI of a copolymer is readily calculated from data obtained from techniques known in the art, such as, for example, TREF as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70% i.e., a CDBI of from about 70% to 99% . Such homogeneous polymers exhibit a relatively narrow melting point range, in comparison with "heterogeneous copolymers", i.e., polymers having a CDBI of less than 55%. Preferably, the homogeneous ethylene/alphaolefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range.

The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefm is a $C_3$–$C_{20}$ alpha-monoolefin, more preferably, a $C_4$–$C_{12}$ alpha-monoolefm, still more preferably, a $C_4$–$C_8$ alpha-monoolefin. Still more preferably, the alpha-olefin comprises at least one member selected from the group consisting of butene- 1, hexene- 1, and octene- 1, i.e., 1-butene, 1-hexene, and 1-octene, respectively. Most preferably, the alpha-olefin comprises octene- 1, and/ or a blend of hexene- 1and butene- 1.

Processes for preparing and using homogeneous polymers are disclosed in U.S. Pat. No. 5,206,075, U.S. Pat. No. 5,241,031, each of which is hereby incorporated by reference thereto, in its entirety and PCT International Application WO 93/03093. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/ alpha-olefin copolymer, propylene/ alpha-olefin copolymer, butene/ alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type. More preferably, however, the polyolefin is a the polymerization product of one or more unsubstituted olefins, the polyamide is the polymerization product of one or more unsubstituted amides, etc.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (TM) linear homogeneous ethylene/alpha olefin copolymer resins obtainable from the Exxon Chemical Company, of Baytown, Texas, and TAFMER (TM) linear homogeneous ethylene/ alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (TM) resins, are also included as another type of homogeneous ethylene/ alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/ alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer (which is also an outer layer) of a plurality of concentrically arranged layers extruded through one or more annular dies.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers extruded through one or more annular dies.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine direction.

As used herein, the phrase "free shrink" refers to the percent dimensional change in a 10 cm×10 cm specimen of film, when shrunk at 200° F., with the quantitative determination being carried out according to ASTM D 2732, as set forth in the 1990 *Annual Book of ASTM Standards*, Vol. 08.02, pp.368–371, which is hereby incorporated, in its entirety, by reference thereto.

Although the film preferably has a film-to-film coefficient of friction of from about 0.1 to 0.9, more preferably the film has a film-to-film coefficient of friction of from about 0.1 to 0.7, still more preferably, from about 0.1–0.6, and yet still more preferably, from about 0.1 to 0.5.

Although the film of the present invention can be either a monolayer film or a multilayer film, preferably the film is a multilayer film. Preferably, the film has a total thickness of less than about 20 mils, more preferably the film has a total thickness of from about 0.2 to 10 mils, still more preferably from about 0.3 to 5 mils, and yet still more preferably, from about 1.5 to 4 mils.

Some of the multilayer films of the present invention are preferably irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 2–15 MR, more preferably 2–10 MR. As can be seen from the descriptions of preferred films for use in the present invention, the most preferred amount of radiation is dependent upon the film composition, thickness, etc., and its end use.

Figure 1:
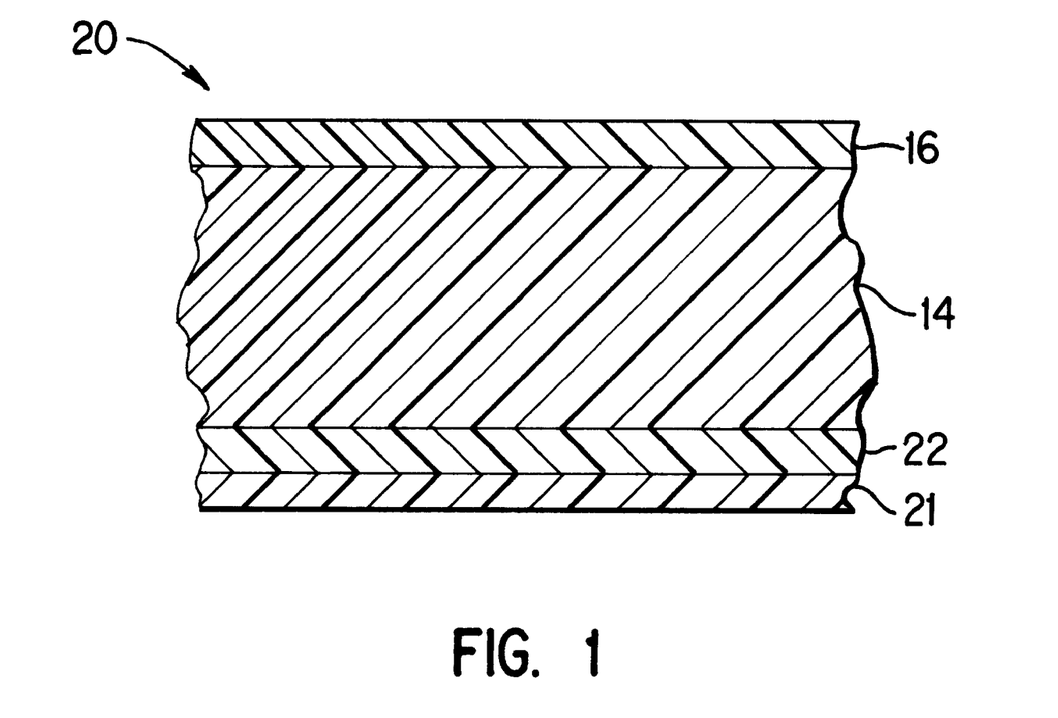
FIG. 1 illustrates a schematic cross-sectional view of a preferred multilayer film according to the present invention.

FIG. 1 illustrates a cross-sectional view of a preferred multilayer film 20. First layer 21 is an outer film layer which preferably serves as an inside food-contact layer which is irradiated so that it is grease-resistant. Second layer 22 serves as a bulk layer, and is preferably irradiated. Third layer 23 serves as $O_2$ barrier to $O_2$. Fourth layer 24 is an outer layer which preferably serves as an outside abuse layer, and which, preferably, is also grease-resistant.

One preferred embodiment of multilayer film 20 has a physical structure, in terms of number of layers, layer thickness, and layer arrangement, and a chemical composition in terms of the various polymers, etc. present in each of the layers, as set forth in Table I, below. This film is herein designated "Film No. 1", and is an example of a multilayer film according to the present invention.

comprising the 9% ethylene/alpha-olefm copolymer and the 1% slip and antiblock inorganic particulates. The ethylene/alphaolefin copolymer was ESCORENE LD203.48 (TM) low density polyethylene homopolymer, obtained from Exxon Chemicals, Incorporated, of Baytown, Tex. The preblend of the ethylene/alpha-olefin copolymer and inorganic particulates can be compounded using a twin-screw compounder, a Banbury mixer, or any other blending apparatus as known to those of skill in the art.

Figure 2:
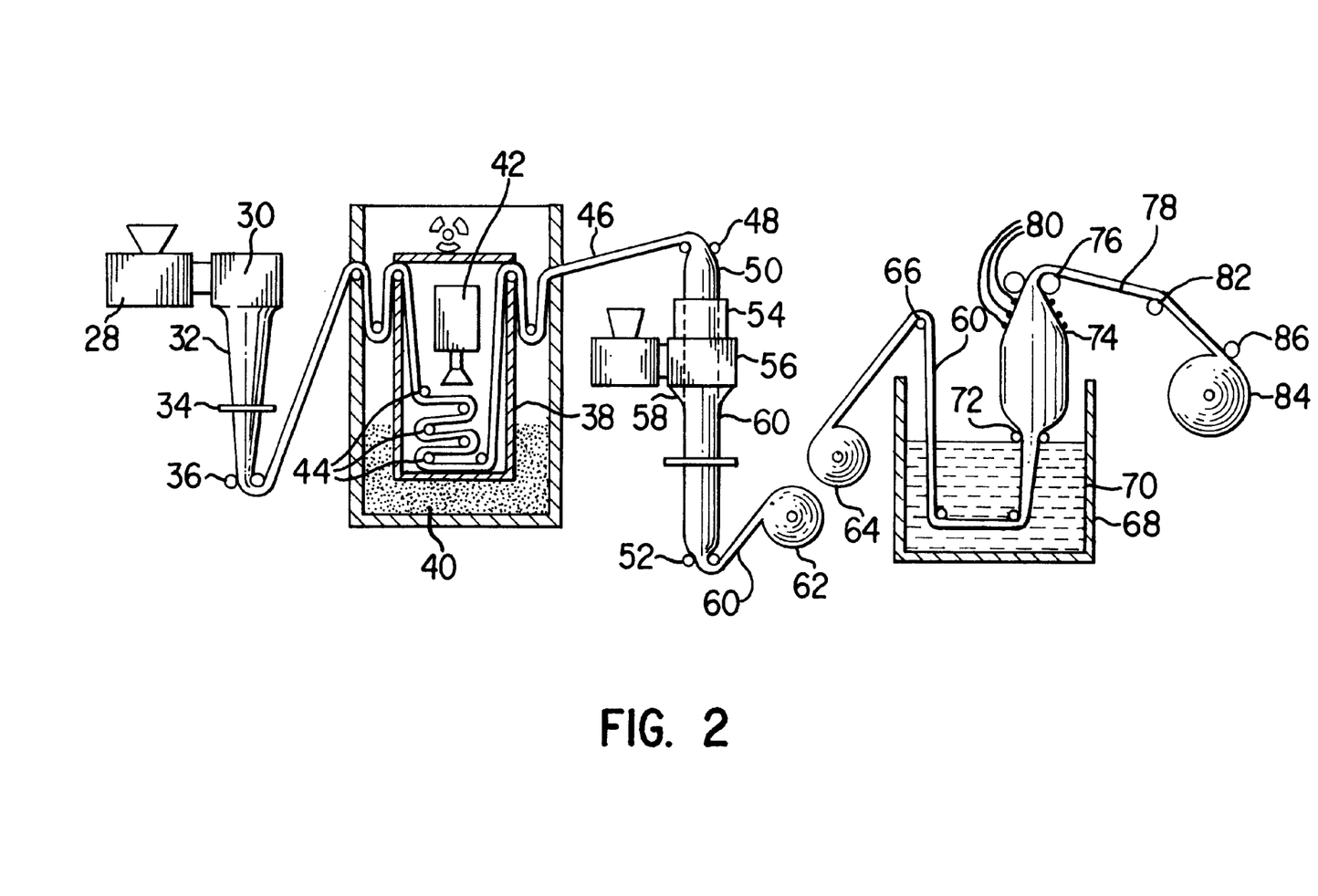
FIG. 2 illustrates a schematic view of a process for producing multilayer films in accordance with the present invention.

Film No. 1 was produced in accordance with a process schematically illustrated in FIG. 2. In the process illustrated in FIG. 2, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 24 mils thick.

After cooling or quenching by water from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 3 to 8 MR.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially

TABLE 1

(Identity of Films of Examples 1–9)

| FIG. 1 Layer Designation | Layer Function | Layer Chemical Identity | Layer Thickness (mils) |
|---|---|---|---|
| 24 | outside, grease-resistant, and abuse-resistant | 90% EVA; 9% ethylene/alpha-olefin copolymer; 1% slip and antiblock inorganic particulates | 0.35 |
| 23 | $O_2$-barrier | PVDC Blend | 0.2 |
| 22 | bulk | irradiated EVA | 1.21 |
| 21 | grease-resistance & sealing | irradiated EVA | 0.54 |

EVA was ELVAX 3128 (TM) ethylene/vinyl acetate copolymer having a vinyl acetate content of 8.9%, a melt index of 2.0, and a density of 0.928 g/cc, obtained from E.I. DuPont de Nemours, of Wilmington, Del.

PVDC Blend was a composition comprising: (a) about 96 weight percent DOW MA134 (TM) vinylidene chloride/methyl acrylate copolymer having a methyl acrylate content of 8.5% , obtained from The Dow Chemical Company, of Midland, Mich.; (b) about 2 weight percent PLAS CHEK 775 (TM) epoxidized soybean oil, obtained from Ferro Chemicals, of Bedford, Ohio; and, (c) about 2 weight percent METABLEN L1000 (TM) acrylate blend, obtained from Elf Atochem, of Philadelphia, Pa. METABLEN L1000 (TM) comprises about 53 weight percent methyl methacrylate ("MMA"), 29 weight percent butylmethacrylate ("BMA"), and 19 weight percent butyl acrylate ("BA").

In Table 1 above, film layer 24 was formed by providing an extruder with 90% EVA and 10% of a preblended mixture circular tubing without significant transverse orientation, i.e., without stretching.

Slightly inflated, irradiated tubing 50 is passed through vacuum chamber 54, and thereafter forwarded through coating die 56. Second tubular film 58 is melt extruded from coating die 56 and coated onto slightly inflated, irradiated tube 50, to form two-ply tubular film 60. Second tubular film 58 preferably comprises an $O_2$ barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is submersed in hot water 70 (having a temperature of about 185° F.) for a retention time of at least about 30 seconds, i.e., for a time period in order to bring the film up to the desired temperature for biaxial orientation.

Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5–1:6, and drawn in a ratio of from about 1:1.55–1:6. More preferably, the stretching and drawing are each performed a ratio of from about 1:2–1:4. The result is a biaxial orientation of from about 1:2.25–1:36, more preferably, 1:4–1:16. While bubble 74 is maintained between pinch rolls 72 and 76, blown tubing 78 is collapsed by rolls 80, and thereafter conveyed through pinch rolls 76 and across guide roll 82, and then rolled onto wind-up roll 84. Idler roll 86 assures a good wind-up.

A total of 9 films were made in accordance with the film of Table 1, using the process as schematically illustrated in FIG. 2, as described immediately above. The films of Examples 1–9 varied in the content of the inorganic particulate additives, i.e., the film of Control Example No. 1 contained no inorganic particulates in outer layer 24, while Comparative Examples 2–4 contained only one type of inorganic particulate (i.e., either spherical or lamellar, but not both) in outer layer 24, with working Examples 5–9 containing a mixture of spherical and lamellar inorganic particulates in outer layer 24.

Each of the films of Examples 1–9 was a 4-layer with each layer consisting of the polymers as set forth in Table 1.

The talc used was ABT-2500 (TM) $Mg_3(Si_2O_5).[OH]_2$, or MICROBLOC (TM) $Mg_3(Si_2O_5).[OH]_2$, obtained from Barretts Minerals Inc., of Dillon, Mont.

The silica used was SYLOBLOC 47 (TM) $SiO_2$, obtained from W. R. Grace & Co. -CONN. Davison Division.

The silicate-1 used was $NaCaAl(Si_2O_7)$, obtained from Mizusawa Industrial Chemicals, sold through International Resources of Columbia, Md.

Machinability was determined on a bag converting machine operating at a commercial speed. Machinability score represents a qualitative assessment of performance during the feeding of the tubing, sealing of the tubing during conversion to bags, the stacking of the bags, and conveying of the bags. Regarding the feeding of the tubing it is important that the film passes freely through the sealing station without jamming due to drag force between the film and the support (which is usually stainless steel) which is too high, or due to sticking on the seal jaws. Bags are "stacked" in a shingled relationship to one another after they are formed by sealing and cutting. These stacked bags need to maintain a relatively straight, aligned relationship, i.e., without bags being shifted sideways, out of alignment along the length of the stream of shingled bags. Regarding the conveying of the bags, it is important to be able to sample the bags without disturbing the straight line relationship of the shingled bags. If the coefficient of friction between the bags is too high, removing one or more bags results in disruption of the straight line relationship of the line of shingled bags. For each of these three criteria, a qualitative score of 1–5 is assessed, with 1 representing poor performance and 5 representing excellent performance. As can be seen in Table 2, the Machinability score is a total of these three ratings for the performance of the film of the respective example.

The coefficient of friction (COF) was determined per ASTM D 1894, hereby incorporated by reference thereto, in its entirety.

The data provided in Table 2, above, demonstrates that films according to the present invention, i.e., the films of

TABLE 2

| Example No. | Identity of Additive | Static Coefficient of Friction | Kinetic Coefficient of Friction | Machin-ability Sore (x/15; x = __) |
|---|---|---|---|---|
| 1 (Control) | None | Blocked | 1.5 | 3 |
| 2 (Comparative) | talc | 0.65 | 0.38 | 3 |
| 3 (Comparative) | silica | 0.35 | 0.25 | 6 |
| 4 (Comparative) | silicate-1 | 0.38 | 0.25 | 10 |
| 5 | talc + silica | 0.45 | 0.25 | 15 |
| 6 | talc + silica | 0.54 | 0.42 | 15 |
| 7 | talc + silicate-1 | 0.41 | 0.27 | 13 |
| 8 | talc + silica + EA | 0.42 | 0.25 | 15 |
| 9 | talc +silicate + EA | 0.37 | 0.24 | 15 |

In each of Examples 1–9, the additives were incorporated into the outside layer of film tube, and in each case the film structure was as set forth in Table 1 above. Examples 2–4 contained 5,000 ppm of each additive. Examples 5–7 contained 2000 ppm talc and 5,000 ppm of the second additive, i.e., silica for Examples 5 and 6, and silicate- 1 for Example 7. Examples 8 and 9 contained 800 ppm erucamide (EA) in addition to 2,000 ppm talc and 5,000 ppm silica.

Examples 5–9, exhibit a higher Machinability score than the films of Comparative Examples 1–4.

Thus, Table 2 provides evidence that films according to the present invention provide improved performance in the area of Machinability, which is believed to be related to the combination of slip and antiblock characteristics derived from the combination of lamellar and spherical particulates present in the outside film layer. The comparative films of Examples 1–4 were substantially identical except that they had, with respect to the presence of inorganic particulates in the outer layer and on the outer surface of the film: (a) no particulates, (b) only spherical particulates, or (c) only lamellar particulates.

The results set forth in Table 2 demonstrate that without loose dust on the outside surface of the film, the combination of spherical and lamellar particulates in the outer layer and on the outer surface of the film provides the film with slip and antiblock properties which are improved over no particulates in the outer layer and on the outer surface; the presence of spherical particulates on the outer surface, without lamellar particulates; and the presence of lamellar particulates on the outer surface, without spherical particulates.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A film comprising an outer layer comprising at least one member selected from the group consisting of ethylene/vinyl acetate copolymer, ethylene/alpha-olefin copolymer, and polyamide, the outer layer further comprising:
   (A) inorganic spherical particulates having an average particle size of from about 0.1 to 30 microns; and
   (B) inorganic lamellar particulates having an average aspect ratio of from about 5:1 to 40:1, and a major dimension of from about 0.1 to 15 microns;
      wherein the spherical particulates and the lamellar particulates are present in an outer film layer and on an outer surface of the film.

2. The film according to claim 1, wherein the lamellar particulates have a hardness of from about 1 to 7, on a Mohs hardness scale.

3. The film according to claim 2 wherein the hardness of the lamellar particulates is from about 1 to 5, on the Mohs hardness scale.

4. The film according to claim 3, wherein the hardness of the lamellar particulates is from about 1 to 3, on the Mohs hardness scale.

5. The film according to claim 1, wherein the composition further comprises a slip enhancer comprising at least one member selected from the group consisting of fatty acid amide, oxidized polyethylene, fatty acid ester, and fatty acid alcohol.

6. The film according to claim 5, wherein the slip enhancer is present in the outer film layer in an amount of from about 50 to 10,000 parts per million, based on the weight of the outer layer.

7. The film according to claim 5, wherein the slip enhancer comprises at least one member selected from the group consisting of erucamide, oleamide, stearamide, behenamide, oxidized polyethylene wax, glycerol monostearate, metallic stearate.

8. The film according to claim 5, wherein the composition further comprises a printability enhancer, wherein the printability enhancer comprises a polar polymer.

9. The film according to claim 8, wherein the polar polymer comprises at least one member selected from the group consisting of ethylene/ester/maleic anhydride terpolymer, ethylene/ester/glycidyl methacrylate terpolymer, and ethylene/acrylic acid copolymer.

10. The film according to claim 8, wherein the printability enhancer is present in the outer film layer in an amount of from about 1 to 25 percent, based on the weight of the outer film layer.

11. The film according to claim 1, wherein:
   the spherical particulates are present in the outer layer of the film at a concentration of from about 500–50,000 parts per million, based on the weight of the outer film layer; and
   the lamellar particulates are present in the outer layer of the film at a concentration of from about 500 to 50,000 parts per million, based on the weight of the outer film layer.

12. The film according to claim 1, wherein:
   the spherical particulates comprise at least one member selected the group consisting of silica and silicate; and
   the lamellar particulates comprise silicate.

13. The film according to claim 12, wherein:
   the spherical particulates comprise at least one member selected the group consisting of natural silica, synthetic silica, and silicate; and
   the lamellar particulates comprise at least one member selected the group consisting of magnesium silicate and hydrated aluminum silicate.

14. The film according to claim 13, wherein:
   the spherical particulates comprise at least one member selected the group consisting of diatomaceous earth, fumed synthetic silica, precipitated synthetic silica, gelled synthetic silica, sodium calcium silicate, and sodium calcium aluminum silicate; and
   the lamellar particulates comprise at least one member selected from the group consisting of talc and kaolin.

15. The film according to claim 1, wherein the film is has a total free shrink, at 185° F., of from about 10 to 100 percent.

16. The film according to claim 1, wherein the film comprises crosslinked polymer.

17. The film according to claim 1, wherein the film is biaxially oriented and heat-shrinkable.

18. The film according to claim 1, wherein the film is a monolayer film.

19. The film according to claim 1, wherein the film is a multilayer film comprising two outer layers, and wherein the composition is present in at least one of the outer layers, and wherein the substantially lamellar particulates are present in the outer layer of the film at a concentration of from about 500 to 50,000 parts per million, based on the weight of the outer film layer.

20. The multilayer film according to claim 19, wherein the multilayer film comprises an $O_2$-barrier layer comprising at least one member selected from the group consisting of polyvinylidene chloride, ethylene/vinyl alcohol copolymer, polyamide, and polyester.

21. The film according to claim 19, wherein the outer layer is a first layer and the multilayer film further comprises:
   an inner second layer, the second layer being an $O_2$-barrier layer, the second layer comprising at least one member selected from the group consisting of polyvinylidene chloride, ethylene/vinyl alcohol copolymer, polyamide, and polyester; and
   an outer third layer comprising at least one member selected from the group consisting of ethylene/vinyl acetate copolymer, ethylene/alpha-olefin copolymer, and polyamide.

22. The film according to claim 21, further comprising a fourth layer between the first layer and the second layer, the fourth layer comprising at least one member selected from the group consisting of ethylene/vinyl acetate copolymer, ethylene/alpha-olefin copolymer, and polyamide.

23. The film according to claim 18, wherein the first layer and the fourth layer each comprise crosslinked polymer, and wherein the second layer and the third layer do not comprise crosslinked polymer.

24. The film according to claim 22, wherein the multilayer film further comprises:
- a fifth layer, the fifth layer being a first tie layer, the fifth layer comprising at least one member selected from the group consisting of ethylene/carboxylic acid copolymer, ethylene/ester copolymer, and anhydride-modified ethylene/alpha-olefin copolymer; and
- a sixth layer, the sixth layer being a second tie layer, the sixth layer comprises at least one member selected from the group consisting of ethylene/carboxylic acid copolymer, ethylene/ester copolymer, and anhydride-modified ethylene/alpha-olefin copolymer; and
- wherein the fifth layer is between the fourth layer and the second layer, the sixth layer is between the second layer and the third layer, and all layers of the multilayer film comprise crosslinked polymer.

25. The film according to claim 21, further comprising an inner fourth layer, the fourth layer being a tie layer, the fourth layer comprising at least one member selected from the group consisting of ethylene/carboxylic acid copolymer, ethylene/ester copolymer, and anhydride modified ethylene/alpha-olefin copolymer.

26. The film according to claim 25, wherein:
- the fourth layer is between the first layer and the second layer; and
- the film further comprises an inner fifth layer, the fifth layer being a second tie layer, the fifth layer comprising at least one member selected from the group consisting of ethylene/carboxylic acid copolymer, ethylene/ester copolymer, and anhydride modified ethylene/alpha-olefin copolymer, the fifth layer being between the second layer and the third layer.

27. The film according to claim 19, wherein the multilayer film is substantially symmetrical with respect to both layer thickness and layer chemical composition.

28. The film according to claim 1, wherein the outer layer comprises a member selected from the group consisting of:
- (A) ethylene/vinyl acetate copolymer;
- (B) ethylene/alpha-olefin copolymer;
- (C) polyamide; and
- (D) a blend of ethylene/alpha-olefin copolymer and ethylene/vinyl acetate copolymer.

* * * * *